US007831604B2

(12) United States Patent
Britton et al.

(10) Patent No.: US 7,831,604 B2
(45) Date of Patent: Nov. 9, 2010

(54) METHODS AND APPARATUS FOR ENTERPRISE APPLICATION INTEGRATION

(76) Inventors: Colin P. Britton, 17 Pheasant La., Lexington, MA (US) 02421; Amir Azmi, 158 Concord Rd., Apt. K-09, Billerica, MA (US) 01821; Ashok Kumar, 447 Boston Post Rd. East, Apt. #96, Marlborough, MA (US) 01752; Noah W. Kaufman, 66C Hampshire St., Cambridge, MA (US) 02139; Chandra Bajpai, 21 Pamela Rd., Natick, MA (US) 01760; Robert F. Angelo, 4 Southwest Cir., Sudbury, MA (US) 01776

( * ) Notice: Subject to any disclaimer, the term of this patent is extended or adjusted under 35 U.S.C. 154(b) by 0 days.

(21) Appl. No.: 11/927,195

(22) Filed: Oct. 29, 2007

(65) Prior Publication Data
US 2008/0109485 A1 May 8, 2008

Related U.S. Application Data

(63) Continuation of application No. 11/430,258, filed on May 8, 2006, which is a continuation of application No. 09/917,264, filed on Jul. 27, 2001, now Pat. No. 7,058,637.

(60) Provisional application No. 60/291,185, filed on May 15, 2001.

(51) Int. Cl.
*G06F 17/30* (2006.01)
(52) U.S. Cl. .................................................. 707/755
(58) Field of Classification Search ................ 707/2, 707/4, 104, 736, 755, 999.002, 999.004, 707/999.204
See application file for complete search history.

(56) References Cited

U.S. PATENT DOCUMENTS 4,701,130 A    10/1987    Whitney et al.

(Continued)

FOREIGN PATENT DOCUMENTS

EP    1132847    9/2001

(Continued)

OTHER PUBLICATIONS

Kerstin Forsberg et al. Extensible use of RDF in a business context. Computer Networks 33 (2000), pp. 347-364: The International Journal of Computer and Telecommunications Networking . Published Jun. 2000.

(Continued)

*Primary Examiner*—James Trujillo
*Assistant Examiner*—Jorge A Casanova

(57) ABSTRACT

A method for enterprise application integration that uses "connectors" that can be instantiated via downloading (e.g., using Java® or other such technologies) to provide interfaces to respective disparate database systems. The databases systems may comprise any variety of now or heretofore known systems, e.g. SAP, Oracle, and so forth. The connectors can, for example, translate between a native language (or API) of the respective database systems and an internal language/protocol of the enterprise application integration system. To this end, the connectors can utilize a scripting language to access the respective database systems. Data retrieved from the database systems can be stored in a central data store in the form of RDF triplets, from which directed graphs can be generated for to generate presentations consolidated from the multiple database systems.

16 Claims, 8 Drawing Sheets

U.S. PATENT DOCUMENTS

| | | | |
|---|---|---|---|
| 4,895,518 A | 1/1990 | Arnold et al. | |
| 4,953,106 A | 8/1990 | Gansner et al. | |
| 5,119,465 A | 6/1992 | Jack et al. | |
| 5,129,043 A | 7/1992 | Yue | |
| 5,199,068 A | 3/1993 | Cox | |
| 5,259,766 A | 11/1993 | Sack et al. | |
| 5,267,865 A | 12/1993 | Lee et al. | |
| 5,270,920 A | 12/1993 | Pearse et al. | |
| 5,301,270 A | 4/1994 | Steinberg et al. | |
| 5,310,349 A | 5/1994 | Daniels et al. | |
| 5,311,422 A | 5/1994 | Loftin et al. | |
| 5,326,270 A | 7/1994 | Ostby et al. | |
| 5,333,254 A | 7/1994 | Robertson | |
| 5,339,390 A | 8/1994 | Robertson et al. | |
| 5,374,932 A | 12/1994 | Wyschogrod et al. | |
| 5,379,387 A | 1/1995 | Carlstedt | |
| 5,381,332 A | 1/1995 | Wood | |
| 5,395,243 A | 3/1995 | Lubin et al. | |
| 5,421,730 A | 6/1995 | Lasker, III et al. | |
| 5,450,480 A | 9/1995 | Man et al. | |
| 5,463,682 A | 10/1995 | Fisher et al. | |
| 5,499,293 A | 3/1996 | Behram et al. | |
| 5,519,618 A | 5/1996 | Kastner et al. | |
| 5,548,506 A | 8/1996 | Srinivasan | |
| 5,579,486 A | 11/1996 | Oprescu et al. | |
| 5,597,312 A | 1/1997 | Bloom et al. | |
| 5,608,789 A | 3/1997 | Fisher et al. | |
| 5,634,053 A | 5/1997 | Noble et al. | |
| 5,655,118 A | 8/1997 | Heindel et al. | |
| 5,732,192 A | 3/1998 | Malin et al. | |
| 5,745,753 A * | 4/1998 | Mosher, Jr. | 707/202 |
| 5,761,063 A | 6/1998 | Jannette et al. | |
| 5,765,140 A | 6/1998 | Knudson et al. | |
| 5,788,504 A | 8/1998 | Rice et al. | |
| 5,795,155 A | 8/1998 | Morrel-Samuels | |
| 5,809,212 A | 9/1998 | Shasha | |
| 5,822,780 A | 10/1998 | Schutzman | |
| 5,826,077 A | 10/1998 | Blakeley et al. | |
| 5,826,252 A | 10/1998 | Wolters, Jr. et al. | |
| 5,829,983 A | 11/1998 | Koyama et al. | |
| 5,832,483 A | 11/1998 | Barker | |
| 5,841,673 A | 11/1998 | Kobayashi et al. | |
| 5,873,076 A | 2/1999 | Barr et al. | |
| 5,875,441 A | 2/1999 | Nakatsuyama et al. | |
| 5,881,269 A * | 3/1999 | Dobbelstein | 703/21 |
| 5,907,837 A | 5/1999 | Ferrel et al. | |
| 5,935,249 A * | 8/1999 | Stern et al. | 726/21 |
| 5,974,441 A | 10/1999 | Rogers et al. | |
| 5,974,443 A | 10/1999 | Jeske | |
| 5,983,267 A | 11/1999 | Shklar et al. | |
| 5,987,415 A | 11/1999 | Breese et al. | |
| 5,995,958 A | 11/1999 | Xu | |
| 6,012,098 A | 1/2000 | Bayeh et al. | |
| 6,035,412 A * | 3/2000 | Tamer et al. | 714/6 |
| 6,044,373 A | 3/2000 | Gladney et al. | |
| 6,044,466 A | 3/2000 | Anand et al. | |
| 6,078,982 A | 6/2000 | Du et al. | |
| 6,085,188 A | 7/2000 | Bachmann et al. | |
| 6,094,652 A | 7/2000 | Faisal | |
| 6,122,632 A | 9/2000 | Botts et al. | |
| 6,125,363 A | 9/2000 | Buzzeo et al. | |
| 6,130,679 A | 10/2000 | Chen et al. | |
| 6,137,797 A | 10/2000 | Bass et al. | |
| 6,144,997 A | 11/2000 | Lamming et al. | |
| 6,151,595 A | 11/2000 | Pirolli et al. | |
| 6,151,624 A | 11/2000 | Teare et al. | |
| 6,154,738 A | 11/2000 | Call | |
| 6,177,932 B1 | 1/2001 | Galdes et al. | |
| 6,182,085 B1 * | 1/2001 | Eichstaedt et al. | 707/104.1 |
| 6,185,516 B1 | 2/2001 | Hardin et al. | |
| 6,185,534 B1 | 2/2001 | Breese et al. | |
| 6,212,502 B1 | 4/2001 | Ball et al. | |
| 6,240,417 B1 | 5/2001 | Eastwick et al. | |
| 6,243,713 B1 | 6/2001 | Nelson et al. | |
| 6,246,320 B1 | 6/2001 | Monroe | |
| 6,266,668 B1 | 7/2001 | Vanderveldt et al. | |
| 6,308,163 B1 | 10/2001 | Du et al. | |
| 6,330,554 B1 | 12/2001 | Altschuler et al. | |
| 6,341,277 B1 | 1/2002 | Coden et al. | |
| 6,360,330 B1 * | 3/2002 | Mutalik et al. | 714/4 |
| 6,369,819 B1 | 4/2002 | Pitkow et al. | |
| 6,380,910 B1 | 4/2002 | Moustakas et al. | |
| 6,381,738 B1 | 4/2002 | Choi et al. | |
| 6,389,429 B1 | 5/2002 | Kane et al. | |
| 6,389,460 B1 | 5/2002 | Stewart et al. | |
| 6,393,423 B1 | 5/2002 | Goedken | |
| 6,396,885 B1 | 5/2002 | Ding et al. | |
| 6,405,211 B1 | 6/2002 | Sokol et al. | |
| 6,405,251 B1 | 6/2002 | Bullard et al. | |
| 6,415,283 B1 | 7/2002 | Conklin | |
| 6,418,413 B2 | 7/2002 | DeMarcken et al. | |
| 6,418,448 B1 | 7/2002 | Sarkar | |
| 6,426,723 B1 | 7/2002 | Smith et al. | |
| 6,427,151 B1 * | 7/2002 | Chan et al. | 707/101 |
| 6,429,870 B1 | 8/2002 | Chen et al. | |
| 6,437,799 B1 | 8/2002 | Shinomi et al. | |
| 6,446,200 B1 | 9/2002 | Ball et al. | |
| 6,446,256 B1 | 9/2002 | Hyman et al. | |
| 6,463,440 B1 | 10/2002 | Hind et al. | |
| 6,473,467 B1 | 10/2002 | Wallace et al. | |
| 6,493,331 B1 | 12/2002 | Walton et al. | |
| 6,493,399 B1 | 12/2002 | Xia et al. | |
| 6,496,833 B1 | 12/2002 | Goldberg et al. | |
| 6,509,898 B2 | 1/2003 | Chi et al. | |
| 6,529,899 B1 | 3/2003 | Kraft et al. | |
| 6,530,079 B1 | 3/2003 | Choi et al. | |
| 6,539,374 B2 | 3/2003 | Jung | |
| 6,542,912 B2 | 4/2003 | Meltzer et al. | |
| 6,546,406 B1 | 4/2003 | DeRose et al. | |
| 6,556,983 B1 | 4/2003 | Altschuler et al. | |
| 6,571,222 B1 | 5/2003 | Matsumoto et al. | |
| 6,577,769 B1 | 6/2003 | Kenyon et al. | |
| 6,583,800 B1 | 6/2003 | Ridgley et al. | |
| 6,594,662 B1 | 7/2003 | Sieffert et al. | |
| 6,598,043 B1 | 7/2003 | Baclawski | |
| 6,606,613 B1 | 8/2003 | Altschuler et al. | |
| 6,625,657 B1 | 9/2003 | Bullard | |
| 6,636,848 B1 | 10/2003 | Aridor et al. | |
| 6,640,284 B1 | 10/2003 | Shaw et al. | |
| 6,643,638 B1 | 11/2003 | Xu | |
| 6,643,652 B2 | 11/2003 | Helgeson et al. | |
| 6,678,679 B1 | 1/2004 | Bradford | |
| 6,701,314 B1 | 3/2004 | Conover et al. | |
| 6,721,747 B2 * | 4/2004 | Lipkin | 707/10 |
| 6,725,227 B1 | 4/2004 | Li | |
| 6,751,663 B1 | 6/2004 | Farrell et al. | |
| 6,754,475 B1 | 6/2004 | Harrison et al. | |
| 6,757,708 B1 | 6/2004 | Craig et al. | |
| 6,771,706 B2 | 8/2004 | Ling et al. | |
| 6,772,148 B2 | 8/2004 | Baclawski | |
| 6,778,971 B1 | 8/2004 | Altschuler et al. | |
| 6,785,341 B2 | 8/2004 | Walton et al. | |
| 6,792,420 B2 | 9/2004 | Chen et al. | |
| 6,804,688 B2 | 10/2004 | Kobayashi et al. | |
| 6,856,992 B2 | 2/2005 | Britton et al. | |
| 6,901,438 B2 | 5/2005 | Davis et al. | |
| 6,925,457 B2 | 8/2005 | Britton et al. | |
| 6,927,728 B2 | 8/2005 | Vook et al. | |
| 6,934,702 B2 | 8/2005 | Faybishenko et al. | |
| 6,940,917 B2 | 9/2005 | Menon et al. | |
| 6,963,875 B2 | 11/2005 | Moore et al. | |
| 7,047,411 B1 | 5/2006 | DeMello et al. | |
| 7,058,367 B1 | 6/2006 | Luo et al. | |
| 7,058,637 B2 | 6/2006 | Britton et al. | |

| | | | |
|---|---|---|---|
| 7,117,260 | B2 | 10/2006 | Bimson et al. |
| 7,171,145 | B2 | 1/2007 | Takeuchi et al. |
| 7,171,415 | B2 | 1/2007 | Kan et al. |
| 7,289,793 | B2 | 10/2007 | Norwood et al. |
| 7,313,588 | B1 | 12/2007 | Shotton, Jr. et al. |
| 2001/0047355 | A1 | 11/2001 | Anwar |
| 2002/0042831 | A1 | 4/2002 | Capone et al. |
| 2002/0049603 | A1 | 4/2002 | Mehra et al. |
| 2002/0049788 | A1 | 4/2002 | Lipkin et al. |
| 2002/0059566 | A1* | 5/2002 | Delcambre et al. .......... 717/146 |
| 2002/0069134 | A1 | 6/2002 | Solomon |
| 2002/0078030 | A1 | 6/2002 | Iwayama et al. |
| 2002/0091678 | A1 | 7/2002 | Miller et al. |
| 2002/0091710 | A1 | 7/2002 | Dunham et al. |
| 2002/0091835 | A1 | 7/2002 | Lentini et al. |
| 2002/0118688 | A1 | 8/2002 | Jagannathan |
| 2002/0120598 | A1 | 8/2002 | Shadmon et al. |
| 2002/0133502 | A1 | 9/2002 | Rosenthal et al. |
| 2002/0143759 | A1 | 10/2002 | Yu |
| 2002/0177232 | A1 | 11/2002 | Melker et al. |
| 2002/0178232 | A1 | 11/2002 | Ferguson |
| 2003/0004934 | A1 | 1/2003 | Qian |
| 2003/0009239 | A1 | 1/2003 | Lombardo et al. |
| 2003/0014399 | A1 | 1/2003 | Hansen et al. |
| 2003/0037145 | A1 | 2/2003 | Fagan |
| 2003/0050834 | A1 | 3/2003 | Caplan |
| 2003/0050927 | A1 | 3/2003 | Hussam |
| 2003/0050929 | A1 | 3/2003 | Bookman et al. |
| 2003/0061209 | A1 | 3/2003 | Raboczi et al. |
| 2003/0074352 | A1 | 4/2003 | Raboczi et al. |
| 2003/0074369 | A1 | 4/2003 | Schuetze et al. |
| 2003/0088639 | A1 | 5/2003 | Lentini et al. |
| 2003/0109951 | A1 | 6/2003 | Hsiung et al. |
| 2003/0229529 | A1 | 12/2003 | Mui et al. |
| 2004/0034651 | A1 | 2/2004 | Gupta et al. |
| 2004/0054690 | A1 | 3/2004 | Hillerbrand et al. |
| 2005/0027563 | A1 | 2/2005 | Fackler et al. |
| 2005/0055330 | A1 | 3/2005 | Britton et al. |
| 2005/0060372 | A1 | 3/2005 | DeBettencourt et al. |
| 2005/0125683 | A1 | 6/2005 | Matsuyama et al. |
| 2006/0271563 | A1 | 11/2006 | Angelo et al. |

FOREIGN PATENT DOCUMENTS

| | | |
|---|---|---|
| GB | 2343763 A | 5/2000 |
| WO | WO-9722096 | 6/1997 |
| WO | WO-9805018 | 2/1998 |
| WO | WO-9810399 | 3/1998 |
| WO | WO-9824020 | 6/1998 |
| WO | WO-9927460 | 6/1999 |

OTHER PUBLICATIONS

S. Alexaki et al. Managing RDF Metadata for Community Webs. Springer Berlin / Heidelberg. vol. 1921/2000, pp. 140-151.
Terence Critchlow. Report on XEWA-00: the XML enabled wide-area searches for bioinformatics workshop. ACM> vol. 30 , Issue 1 (Mar. 2001).
Semantic Web Workshop 2001. Proceedings of the Second International Workshop on the Semantic Web. SemWeb'2001. S. Staab et al. Hong Kong, China, May 2001.
M. R. Kogalovsky. Systematization of information resources collections in digital libraries. MAIK Nauka/Interperiodica distributed exclusively by Springer Science+Business Media LLC. vol. 26, No. 3 / May, 2000, pp. 140-155.
Ludascher, B. Gupta, A. Martone, M.E.Model-based mediation with domain maps. Data Engineering, 2001. Proceedings. 17th International Conference on Publication Date: 2001. pp. 81-90. Meeting Date: Apr. 2, 2001-Apr. 6, 2001.
Berniers-Lee et al. RFC 2396: Uniform Resource Identifiers (URI): Generic Syntax (Aug. 1998) http://www.cs.tut.fi/.about.jkorpela/rfc/2396/full.html, 23 pages, downloaded on Feb. 20, 2003.
Forgy, Charles L. "Rete: A Fast Algorithm for the Many Pattern/Many Object Pattern Match Problem," Artifical Intelligence vol. 19 (1982) pp. 17-37.
Melnik, Sergey, "Storing RDF in a relational database," http://www-db.stanford.edu/.about. melnik/rdf/db.html, 5 pages, downloaded on 20/20/2003.
Quinlan, J. R., "Induction of Decision Trees," Machine Learning vol. 1 (1986) pp. 18-106.
Resource Description Framework (RDF) Model and Syntax Specification W3C Recommendation (Feb. 22, 1999) http://www.w3.org. TR/1999/REC-rdf-syntax-19990222/, 34 pages, downloaded on Feb. 20, 2003.
"The Rete Algorithm," http://herzberg.ca.sandia.gov/jess/docs/52/rete.html, 3 pages, downloaded on Feb. 20, 2003.
"Inkling: RDF Query Using SquishQL," downloaded from http://swordfish.rdfweb.org/rdfquery/ on Mar. 20, 2003, 2 pages.
"rdfDB Query Language," downloaded from http://www.guha.com/rdfdb/query.html on Mar. 20, 2003, 4 pages.
"RDQL—RDF Data Query Language," Hewlett-Packard Company, . COPYRGT. 1994-2003, downloaded from http://www.hpl.hp.com/semweb/rdql.htm on Mar. 20, 2003, 3 pages.
Kerschberg, L. "Knowledge Management in Heterogenous Data Warehouse Environments," Pub. 2001.
Karvounarakis, G. et al., "Querying Community Web Portals" Pub. 2000.
Amann, B. et al., "Integrating Ontologies and Thesauri for RDF Schema Creation and Metadata Querying" Mar. 6, 2001.
Rogers, N., "SWAD-Europe deliverable 4.2: Semantic Web and Web Services: RDF/XML and Soap for Web Data Encoding" Year 2001.
Miller, L., "Aggregating Recommendations Using RDF," ILRT. Org. Pub. Jan. 10, 1999.
Jenkins, C. et al., "Automatic RDF Metadata Generation for Resource," Computer Networks, 1999.
Gray, M., "Semantic Labeling" HIVE. May 14, 1999. Retrieved from: http://hive.sourceforge.net/mkgray-thesis/html/node8.html.
Card et al., "Readings in Information Visualizing Using Vision to Think", 1999, Morgan Kaufmann, p. 298.
"The Surveillance and Monitoring Component of the Public Health Information Network", website for the Centers for Disease Control and Prevention, http://www.cdc.gov/nedss, printed Nov. 14, 2005, 2 pages.
"An Overview of the NEDSS Initiative", website for the Centers for Disease Control and Prevention, http://www.cdc.gov/nedss/About/overview.html, printed Nov. 14, 2005, 2 pages.
"Background on Public Health Surveillance", website for the Centers for Disease Control and Prevention, http://www.cdc.gov/nedss/About/purpose.htm, printed Nov. 14, 2005, 3 pages.
"Description of the NEDSS Base System," Mar. 28, 2001, 5 pages.
"NEDSS Base System Fact Sheet", website for the Centers for Disease Control and Prevention, 2 pages.
"NEDSS Logical Data Model (NLDM) Overview and Users' Guide", Version 1.0, 92 pages.
"NEDSS Systems Architecture", Version 2.0, Apr. 15, 2001, 5 pages.
"NEDSS and NEDSS PAMs Business Discovery Statement", Version 1.2, Mar. 9, 2002, 23 pages.
"Overview of PHIN", Centers for Disease Control and Prevention website, http://www.cdc.gov/phin, printed Jan. 18, 2005, 3 pages.
Public Health Information Network, The Association of State and Territorial Health Officials website, http://www.astho.org/?template=public_health_info_network.html, printed Jan. 18, 2005, 2 pages.
"MaestroTM Public Health Suite," Orion International website, http://www.orionhealth.com/maestro_overview.htm, printed Jan. 18, 2005, 3 pages.
Published International Search Report (published May 24, 2007) and Written Opinion (mailed Feb. 12, 2007) for PCT/US05/005725.
Churchill, R. et al. "RDT Technical Overview" Mozilla.org. Last modified 11, 1999. Retrieved from http://www.mozill.org/rdf/doc/api.html.
Brickley, Dan et al., "RDF, squish etc." Pub on the web Nov. 26, 2000. Retrieved from http://www.ilrt.bris.ac.uk/discovery/2000/111/QL/QL.txt.

Brickley, Dan et al. "SWIPE 0.1 specification" Pub. 2001. Retrieved from: http:rdfweb.org/2001/01/swipe/.

Beckett, D. "The Design and Implementation of the Redland RDF Application Framework," Copyright WWW01 May 2-5, 2001. Retrieved from http:www10.org/cdrom/papers/490/.

Sergey Melnik et al. Representing Order in RDF. Pub. Jan. 7, 2001. Retrieved from:http://infolab.stanford.edu/~stefan/daml/order.html.

Frank Manola, "Towards a Richer Object Model", SIGMOD Record, vol. 27, No. 1, Mar. 1998, 6 pages.

"National Electronic Disease Surveillance System (NEDSS): A standards-Based Approach to Connect: Public Health and Clinical Medicine", J. Public Health Management Practice, 2001. 7(6], 43-508 pages.

Lois Delcambre et al., "Bundles in Captivity: An Application of Superimposed Information", IEEE 2001, pp. 111-120.

William A. Yasnoff et al., "Public health informatics: Improving and transforming public health in the information age" Topics in Health Information Management, Frederick; Aspen Publishers; Feb. 2001; 8 pages.

Public Health Information Network Functions and Specifications, Version 1.2—Dec. 18, 2002; DRAFT; 56 pages.

Supplemental European Search Report dated Aug. 21, 2007 (5 pages).

Miller, Eric et al., RDF Primer, W3C @@ Editor's Draft Jan. 27, 2002 @@, Copyright 2001, 2002 (MIT,INRIA, Keio) (22 pages).

Six, Janet, M. et al, "Effective e Graph Visualization Via Node Grouping", Proceedings of the IEEE Symposium on Information Visualization 2001 (INFOVIS'01) (8 pages).

Gandon, Fabien et al. "A Multi-Agent System to Support Exploiting an XML-based Corporate Memory" INRIA, ACACI Project, 2004 Route des Lucioles, 06902 Sophia Antipolis, France, Proc. of the Third Int. Conf. on Practical Aspects of Knowledge Management (PAKM2000) Basel, Swwitzerland, Oct 30-31, 2000, (U.Reimer, ed.).

Thompson, Craig "Workshop on Compositional Software Architectures Workshop Report," Software Engineering Notes, vol. 23. No. 3, May 1998.

Takeda, Koichi, "Site Outlining," IBM Research, Tokyo Research Lab, 1623-14; Mar. 1998.

Bucher, Alex et al. "Discovering Internet Marketing Intelligence through Online Analytical Web Usage Mining," SIGMOD Record, vol. 27, No. 4, Dec. 1998.

Ouksel, Aris et al. "Semantic Interoperability in Global Information Systems," SIGMOD Record, vol. 28, No. 1, Mar. 1999.

Sycara, Katia et al. "Dynamic Service Matchmaking Among Agents in Open Information," SIGMOD Record, vol. 28, No. 1, Mar. 1999.

Buneman et al "Interaction between Path and Type Constraints", Proceedings of ACM Symposium on Principles of Database Systems, 1999, pp. 56-67.

Swick, Ralph, "RDF:Weaving the Web of Discovery: Putting it Together," netWorker archive, vol. 3 , Issue 2 (Jun. 1999) , pp. 21-25 , Year of Publication: 1999 , ISSN:1091-3556.

Suciu, Dan "Managing Web Data," ACM SIGMOD Record archive, vol. 28 , Issue 2 (Jun. 1999), p. 510 , Year of Publication: 1999, ISSN:0163-5808.

Crestani, Fabio "Vocal Access to a Newspaper Archive: Design Issues and Preliminary Investigations," International Computer Science Institute; Mar. 1999.

McGrath et al, "Digital Library Technology for Locating and Accessing Scientific Data," International Conference on Digital Libraries , Proceedings of the fourth ACM conference on Digital libraries , Berkeley, California, United States , pp. 188-194 , Year of Publication: 1999 . ISBN:1-58113-145-3.

Thomas Lee, et al "Information integration with attribution support for corporate profiles," Information integration with attribution support for corporate profiles, Conference on Information and Knowledge Management, Proceedings of the eighth international conference on Information and knowledge management , Kansas City, Missouri, United States , pp. 423-429 ,Year of Publication: 1999 , ISBN:1-58113-146-1.

Tudhope et al "Semantically Indexed Hypermedia: Linking Information Disciplines," ACM Computing Surveys (CSUR), vol. 31 , Issue 4es (Dec. 1999), Article No. 4, Year of Publication: 1999 , ISSN:0360-0300.

Bonifati, "Comparative Analysis of Five XML Query Languages," SIGMOD Record, vol. 29, No. 1, Mar. 2000.

Carr, Leslie et al. "The Evolution of Hypertext Link Services," ACM Computing Surveys, vol. 31, No. 4es, Dec. 1999.

Fan, Wenfei, "Integrity Constraints for XML," ACM Symposium on Principles of Database Systems archive Proceedings of the nineteenth ACM SIGMOD-SIGACT-SIGART symposium on Principles of database systems; Dallas, Texas, United States; pp. 23-34 ; Year of Publication: 2000.

Chen, James et al "A Distributed Multi-Agent System for Collaborative Information Management and Sharing," RBAC 2000, Berlin, Germany ISBN 1-58113-259-x/00/07; 2000.

Melnik, Sergey "A Mediation Infrastructure for Digital Library Services," Digital Libraries, San Antonio, TX ACM 2000-581 13-231 x/00/0006; 2000.

Melnik, Sergey "Building a Distributed Full-Text Index of the Web," WWW10, May 1-5, 2001, Hong Kong ACM 1-58113-348-0/01/00005.

Conference Review Department, "Semantic Web Workshop: Models, Architectures and Management of Sep. 21, 2000" Intelligence, Summer 2001, pp. 39-44.

Brickley, Dan "Semantic Web History: Nodes and Arcs 1989-1999," The WWW Proposal and RDF, revised Mar. 2001 http:www.w3.org/1999/11/11-WWWProposal/.

Halpin, Harry et al "W3C Semantic Web Activity," W3C Sematic Web, http://www.w3.org/2001/sw/; last updated Apr. 6, 2009, copyright 1994-2009.

Prudhommeaux, Eric "Check and Visualize your RDF," W3C website, Feb. 15, 2007, http://www.w3.org/RDF/Validator/.

RDF Interest Group 1999-2004, available at W3C Semantic Web, http://www.w3.org/RDF/Interest/ ; last updated Dec. 8, 2005; downloaded Apr. 2009.

Berners-Lee, Tim "Information Management: A Proposal," Mar. 1989 and May 1990; 14 pages.

Beckett, Dave Dave Beckett's Resource Description Framework (RDF) Resource Guide, available at http://planetrdf.com/guide, last updated Sep. 23, 2005, 26 pages.

Brickley, Dan "RDF Query in Javascript demo," W3C website, Jul. 28, 2001, http://www.w3.org/1999/11/11-WWWProposal/rdfqdemo.html.

Extensible Markup Language (XML), W3C Sematic Web, http://www.w3.org/XML/ ; last updated Apr. 5, 2009; copyright 1996-2003; 5 pages.

Berniers-Lee et al, "The Enquire Manual," Oct. 1980, http://infomesh.net/2001/enquire/manual/.

Dublin Core Metadata Initiative, available at http://dublincore.org, web page last updated Mar. 31 2009, copyright 1995-2009; 1 page.

Resource Description Framework, (RDF) Schema Specification, W3C Proposed Recommendation Mar. 3, 1999, http://www.w3.org/TR/1999/PR-rdf-schema-19990303/.

Berners-Lee et al "Web Architecture: Describing and Exchanging Data," W3C Recommendations, Jun. 7, 1999, http://www.w3.org/1999/06/07-WebData.

Berners-Lee, "Semantic Web Road Map," W3C Recommendations, Sep. 1998, http://www.w3.org/DesignIssues/Semantic.html.

Lassila, et al "Resource Description Framework (RDF) Model and Syntax Specification," W3C Recommendations, Feb. 22, 1999.

Berners-Lee, "What a semantic web can represent," W3C Recommendations, Sep. 1998.

Fensel, D. "Ontobroker: Or How to Enable Intelligent Access to the WWW," Proceedings of the 11th Banff Knowledge Acquisition for Knowledge-Based System Workshop (KAW98), Banaff, Kanada, Apr. 1998.

Swick, R. "The Cambridge Communique," W3C Recommendations, Oct. 1999, http://www.w3.org/TR/schema-arch.

Technical Reports and Communications, W3C website, http://www.w3.org/TR/ ; last updated Apr. 21, 2009; copyrighted 1994-2006.

Bray, Tim et al. "Extensible Markup Language," W3C Recommendations, Feb. 10, 1998, http://www.w3.org/TR/1998/REC-xml-19980210.

Cowan, John et al. "XML Information Set," W3C Recommendations, May 17, 1999, http://www.w3.org/TR/1999/WD-xml-infoset-19990517.

Extensible Markup Language Activity Statement, W3C Ubiquitous Web, http://www.w3.org/XML/Activity; downloaded Apr. 10, 2009; 3 pages.

Clark, James Editor "XSL Transformations," W3C Recommendations, Nov. 16, 1999, http://www.w3.org/TR/xslt.

Manola, Frank Editor "RDF Primer," W3C Working Draft, Mar. 2002, http://www.w3.org/TR/2002/WD-rdf-primer-20020319/.

Malhotra, Ashok et al., "XML Schema Requirements," W3C Note, Feb. 15, 1999, http://www.w3.org/TR/NOTE-xml-schema-req.

Web site; http://www.w3.org/DesignIssues/RDFnot.html ; Sep. 27, 2004 ; 8 pages.

Shankar, Ravi D. et al., "Epoch: an Ontological Framework to Support Clinical Trials Management", [1]Stanford Medical Informatics, Stanford University School of Medicine, Stanford, CA, USA, [2]The Immune Tolerance Network, Pittsburgh, PA, USA, pp. 25-32, Nov. 11, 2006, Copyright 2006.

Sergey Melnik and Stefan Decker, "A Layered Approach to Information Modeling and Interoperability on the Web", Database Group, Stanford Univ., Sep. 4, 2000, 13 pages.

Dan Brickley and Libby Miller, "RDF, SQL and the Semantic Web—A Case Study", www.ilrt.org/discovery/2000/10/swsql/, latest version Nov. 8, 2000 (initial draft Oct. 31, 2000), 8 pages.

Omelayenko, B., "Learning of Ontologies for the Web: the Analysis of Existent Approaches" Proceedings of the International Workshop on Web Dynamics Held in Conj. With the 8th Internationsl Conference on Database Theory Jan. 3, 2001 pp. 1-10, XP002378744, London, UK.

Nick, Z.Z. et al., "Web Search Using a Genetic Algorithm" IEEE Internet Computing, vol. 5, No. 2, Mar. 2001, pp. 18-26, XP002378745, USA.

Supplemental European Search Report for European Application No. 02736950.3 dated May 19, 2006, 4 pages.

European Patent Office Communication Pursuant to Article 96(2) for European Applicaiton No. 02741744.2, dated Dec. 8, 2006, 12 pages.

International Search Report for International Appliaction No. PCT/US05/05725, dated Feb. 12, 2007, (9 pages).

* cited by examiner

METHODS AND APPARATUS FOR ENTERPRISE APPLICATION INTEGRATION

This application is a continuation of U.S. patent application Ser. No. 11/430,258, filed May 8, 2006, entitled "Methods and Apparatus for Enterprise Application Integration" (now published as US 2006/0277227, the teachings of which are incorporated herein by reference), which is a continuation of U.S. patent application Ser. No. 09/917,264, filed Jul. 27, 2001, entitled "Methods and Apparatus for Enterprise Application Integration" (now issued as U.S. Pat. No. 7,058,637, the teachings of which are incorporated herein by reference), which claims the benefit of priority of U.S. provisional patent application Ser. No. 60/291,185, filed on May 15, 2001, entitled "Methods and Apparatus for Enterprise Application Integration," the teaching of which are incorporated by reference. The teachings of all of the foregoing applications are incorporated herein by reference.

BACKGROUND OF THE INVENTION

The invention pertains to digital data processing and, more particularly, to methods and apparatus for enterprise application integration. It has application in the dynamic consolidation of disparate databases, e.g., of marketing, e-commerce or other transactional data, over a network, such as the Internet.

It is not uncommon for a single company to have several database systems—separate systems not interfaced—to track internal and external planning and transaction data. Such systems might of been developed at different times throughout the history of the company and are therefore of differing generations of computer technology. For example, a marketing database system tracking customers may be ten years old, while an enterprise resource planning (ERP) system tracking inventory might be two or three years old. Integration between these systems is difficult at best, consuming specialized programming skill and constant maintenance expenses.

A major impediment to enterprise application integration (EAI) is the consolidation of these disparate legacy databases with one another and with newer e-commerce databases. For instance, inventory on-hand data gleaned from a legacy ERP system may be difficult to combine with customer order data gleaned from web servers that support e-commerce (and other web-based) transactions. This is not to mention difficulties, for example, in consolidating resource scheduling data from the ERP system with the forecasting data from the marketing database system.

An object of this invention is to provide improved methods and apparatus for digital data processing and, more particularly, for enterprise application integration.

A further object of the invention is to provide such methods and apparatus as can be readily and inexpensively integrated with legacy, current and future database management systems.

A still further object of the invention is to provide such methods and apparatus as can be implemented incrementally or otherwise without interruption of enterprise operation.

Yet a still further object of the invention is to provide such methods and apparatus as to facilitate ready access to up-to-date enterprise data, regardless of its underlying source.

Yet still a further object of the invention is to provide such methods and apparatus as permit flexible presentation of enterprise data in an easily understood manner.

SUMMARY OF THE INVENTION

The aforementioned are among the objects attained by the invention, one aspect of which provides a method for enterprise application integration that uses software ("connectors") that can be instantiated via downloading (e.g., using Java® or other such technologies) to provide interfaces to respective disparate database systems. The databases systems may comprise any variety of now or heretofore known systems, e.g. SAP, Oracle, and so forth.

The connectors can, for example, translate between a native language (or API) of the respective database systems and an internal language/protocol of the enterprise application integration system. To this end, the connectors can utilize a scripting language to access the respective database systems.

Another aspect of the invention provides methods as described above that store data accessed from the database systems in a central data store, referred to below as a "holographic" data store. That data can be stored, for example, as resource definition framework (RDF) triplets.

The connectors, according to further aspects of the invention, can query the respective database systems based on requests received from the holographic data store and/or from a framework server, a user or otherwise. In related aspects, the data store is periodically updated via application of queries to the database systems.

Further aspects of the invention provide methods as described above in which a graph generator generates directed graphs from the RDF triplets in the holographic store. The graphs can be "walked" in order to discern answers to queries for information reflected by triplets originating from data in one or more of the databases.

Another aspect of the invention provides methods as described above in which a framework server accepts queries, e.g., from a user, and formats them for application to the holographic data store.

Further aspects of the invention provide enterprise application integration systems that operate in accord with the foregoing.

These and other aspects of the invention are evident in the drawings and in the description that follows.

BRIEF DESCRIPTION OF THE DRAWINGS

The foregoing features of this invention, as well as the invention itself, may be more fully understood from the following detailed description of the drawings in which.

DETAILED DESCRIPTION OF THE ILLUSTRATED EMBODIMENT

Figure 1:
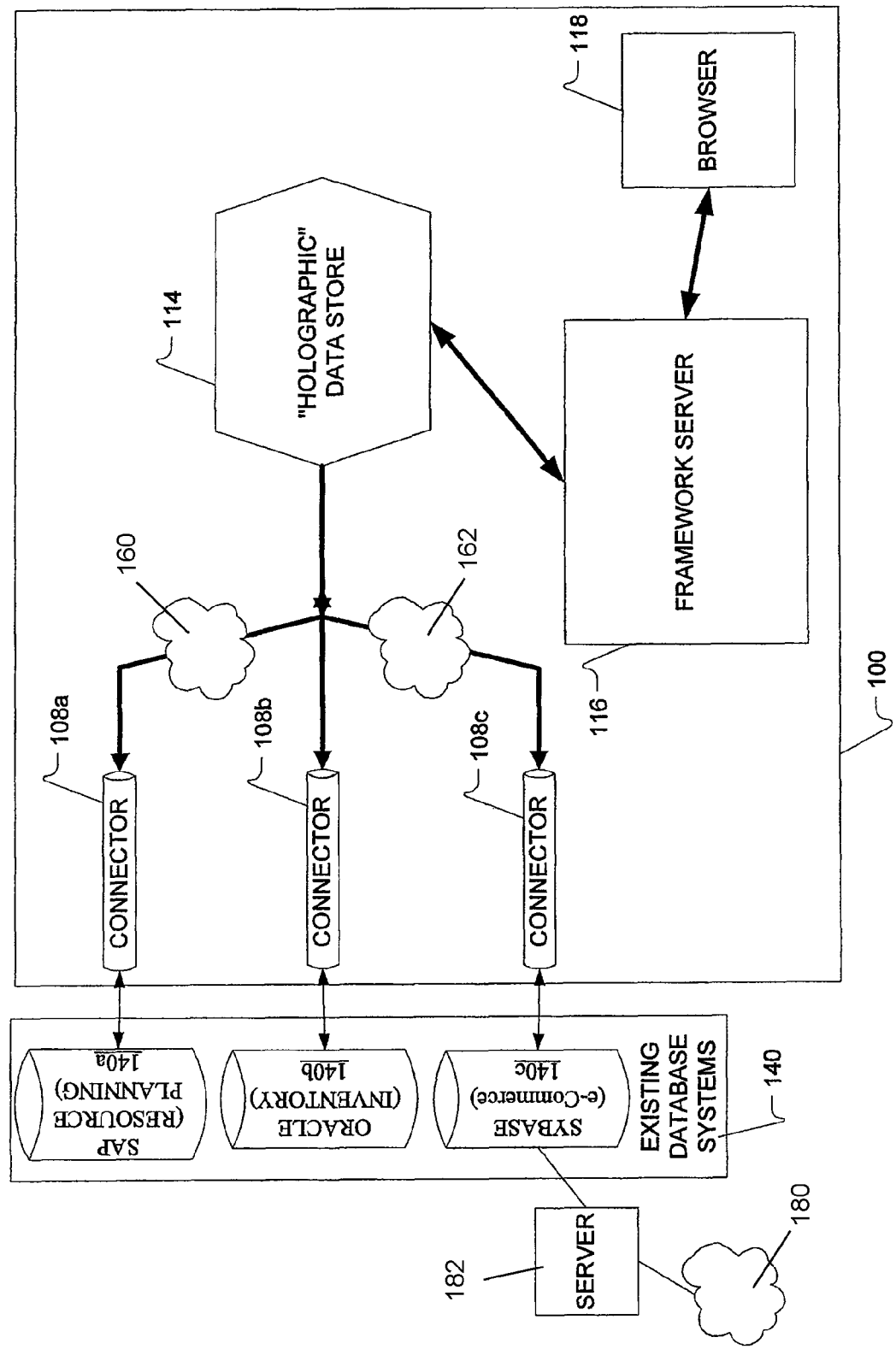
FIG. 1 depicts an improved enterprise application integration system according invention.

FIG. 1 depicts a enterprise application integration system according to the invention. The illustrated system 100 includes connectors 108 that provide software interfaces to legacy, e-commerce and other databases 140 (hereinafter, collectively, "legacy databases"). A "holographic" database 114 (hereinafter, "data store" or "holographic data store"), which is coupled to the legacy databases 140 via the connectors 108, stores data from those databases 140. A framework server 116 accesses the data store 114, presenting selected data to (and permitting queries from) a user browser 118. The server 116 can also permit updates to data in the data store 114 and, thereby, in the legacy databases 140.

Legacy databases 140 represent existing (and future) databases and other sources of information in a company, organization or other entity (hereinafter "enterprise"). In the illustration, these include a retail e-commerce database (e.g., as indicated by the cloud and server icons 180, 182 adjacent database 140*c*) maintained with a Sybase® database management system, an inventory database maintained with an Oracle® database management system and an ERP database maintained with an SAP® database management system. Of course, these are merely examples of the variety of databases or other sources of information with which methods and apparatus as described herein can be used. Common features of illustrated databases 140 are that they maintain information of interest to an enterprise and that they can be accessed via respective software applications program interfaces (API) or other mechanisms known in the art.

Connectors 108 serve as an interface to legacy database systems 140. Each connector applies requests to, and receives information from, a respective legacy database, using that database's API or other interface mechanism. Thus, for example, connector 109*a* applies requests to legacy database 140*a* using the corresponding SAP API; connector 108*b*, to legacy database 140*b* using Oracle API; and connector 108*c*, to legacy database 140*c* using the corresponding Sybase API.

In the illustrated embodiment, these requests are for purposes of accessing data stored in the respective databases 140. The requests typically originate in the holographic data store 114 or the framework server 116, wherefrom they are routed to the connectors via the store 114. Alternatively or in addition, the requests can originate, in the first instance, from the connectors 108 themselves, e.g., by way of pre-programming or otherwise. Regardless of their origin, the requests can be stored in the connectors 108 for application and/or reapplication to the respective legacy databases 108.

Data and other information (collectively, "messages") generated by the databases 140 in response to the requests are routed by connectors to the holographic data store 114. Those messages can be cached by the connectors 108, though, they are preferably immediately routed to the store 114.

The software connectors 108 may reside on any digital data processing system(s) that is (are) in communications coupling—e.g., via a dial-up connection, bus, cable, network and/or Internet (as indicated by cloud icons 160, 162), or otherwise—with the respective legacy databases 140 and with the holographic data store 114. Typically, the connectors reside on computers within the firewall (or other security barrier) of the enterprise, though, they may reside elsewhere (e.g., local to the holographic store 114 and/or the framework server 116).

In a preferred embodiment, the connectors are implemented as Java® servlets, or the like, though they can be implemented in any programming language. Indeed, the connectors fabricated as special purpose hardware devices, though, such hardware lacks one of the immediate advantages of Java (or other software) implemnentations—to with, the ability to download and/or remotely implement, upgrade and maintain it.

In embodiments, such as that illustrated here, wherein the connectors 108 are implemented as Java® servlets, or the like, those connectors preferably execute with a suitable environment, e.g., utilizing Java virtual machines running scripted Extensible Markup Language ("XML") operating according Extensible Stylesheet Language Transformation ("XSLT") scripts. A suitable environment for accomplishing this is Tomcat running under Cocoon 2, both available from Apache Software Foundation or in the alternative, WebSphere available from IBM Corporation. As such, the use of XSLT scripts allow the connector to communicate with a variety of database systems by merely downloading the XSLT using any computer readable medium, e.g. disk, electronic download, or CD-ROM.

Figure 2:
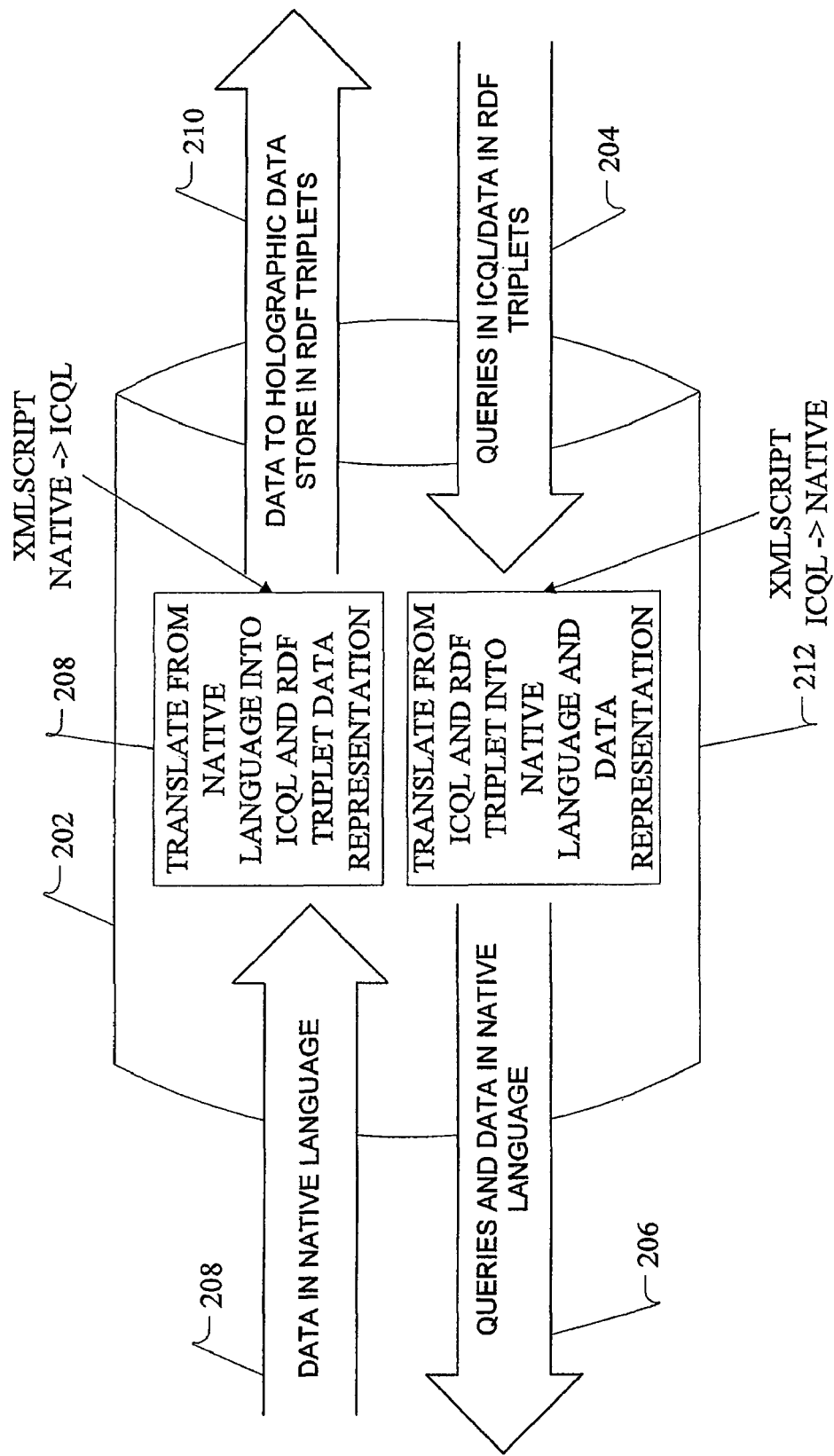
FIG. 2 depicts operation of a software interface "connector" according to the invention.

Referring to FIG. 2, the connectors translate between the API (or other interface mechanisms) of the legacy databases 140 and a language/protocol common to the connectors 108, the holographic data store 114 and the framework server 116. In the illustrated embodiment, that common language/protocol is referred to Intelligent Connector Query Language (ICQL), though, it will be appreciated that other embodiments may use other languages/protocols and, indeed, may not utilize a common language/protocol at all. Thus, for example, requests generated by holographic data store 114 and routed to connector 108*a* in ICQL (or other language/protocol) are converted (or translated or transformed) by that connector into an appropriate API call to legacy database 140*a*. Likewise, messages generated by that database 140*a* in response to such a request are converted by the connector 108*a* back into ICQL (or other language/protocol).

Figure 3:
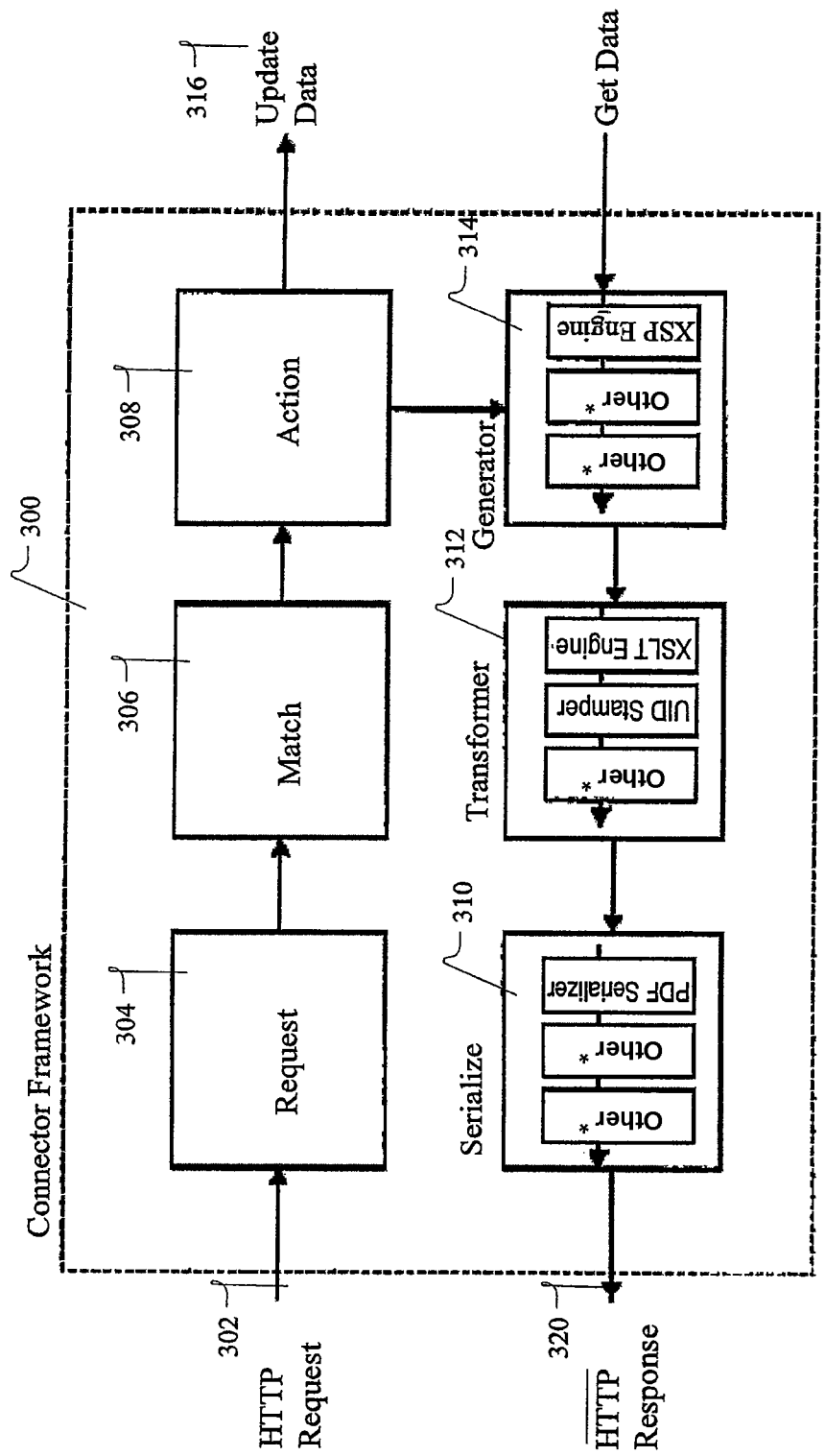
FIG. 3 depicts data flow within a connector according to the invention.

A more complete understanding of the operation of the connectors 108 may be attained by reference to FIG. 3, which shows data flow within a connector 300 according to one embodiment of the invention.

Illustrated is a connector 300 utilizing Hypertext Transfer Protocol ("HTTP") as a vehicle to transfer messages (e.g., requests and responses thereto) with holographic data store 114, such as the one illustrated in FIG. 1. Each message 302 (e.g., request) originating from the data store 115 is processed by request, match and action modules 304-308, as shown. The message is sent to the connected legacy database, e.g., 140*a*, using the appropriate API or other interface mechanism. It will be apparent to those of ordinary skill in the art that the actual transformation sequence is dependent on the type of legacy database system being accessed and the method of communication between the holographic data store and the connector framework.

Messages received by the connector 300 from the legacy database are likewise processed for return to the holographic data store 114. In the illustrated example, a message 318 is received and routed to a generator module 314 which performs a transformation according to a XSP script, and then routes the message to a transformer module 312. The transformer module 302 transforms the data field contained within the message into RDF triplet form suitable for the holographic data store 114 to catalog, and assigns a unique Universal Identification Number ("UID") for later conversion into a Universal Resource Locator ("URL") by the data store 114. Finally, the message is routed to a serializer module 310 and transformed for HTTP transfer to the holographic data store 320.

Through use a connector framework comprised of selectable modules, the connectors may be electronically downloaded or otherwise remotely updated as required. Moreover, multiple engines/modules can be inserted in the internal data pipeline of connector 300. Each such module transforms the data and passes it along the stream.

Referring back to FIG. 1, the holographic data store 114 stores data from the legacy databases 140 and from the framework server 116 as RDF triplets. The data store 114 can be embodied on any digital data processing system or systems that are in communications coupling (e.g., as defined above) with the connectors 108 and the framework server 116 capable of supporting Java® running XML/XSLT as defined above. Typically, the data store 114 is embodied in a workstation or other high-end computing device with high capacity storage devices or arrays, though, this may not be required for any given implementation.

Though the holographic data store 114 may be contained on an optical storage device, this is not the sense in which the term "holographic" is used. Rather, it refers to its storage of data from multiple sources (e.g., the legacy databases 140) in a form which permits that data to be queried and coalesced from a variety of perspectives, depending on the needs of the user and the capabilities of the framework server 116. To this end, a preferred data store 114 stores the data from the legacy databases 140 in object-predicate-subject form, e.g., RDF triplets, though those of ordinary skill in the art will appreciate that other forms may be used as well, or instead.

Figure 4:
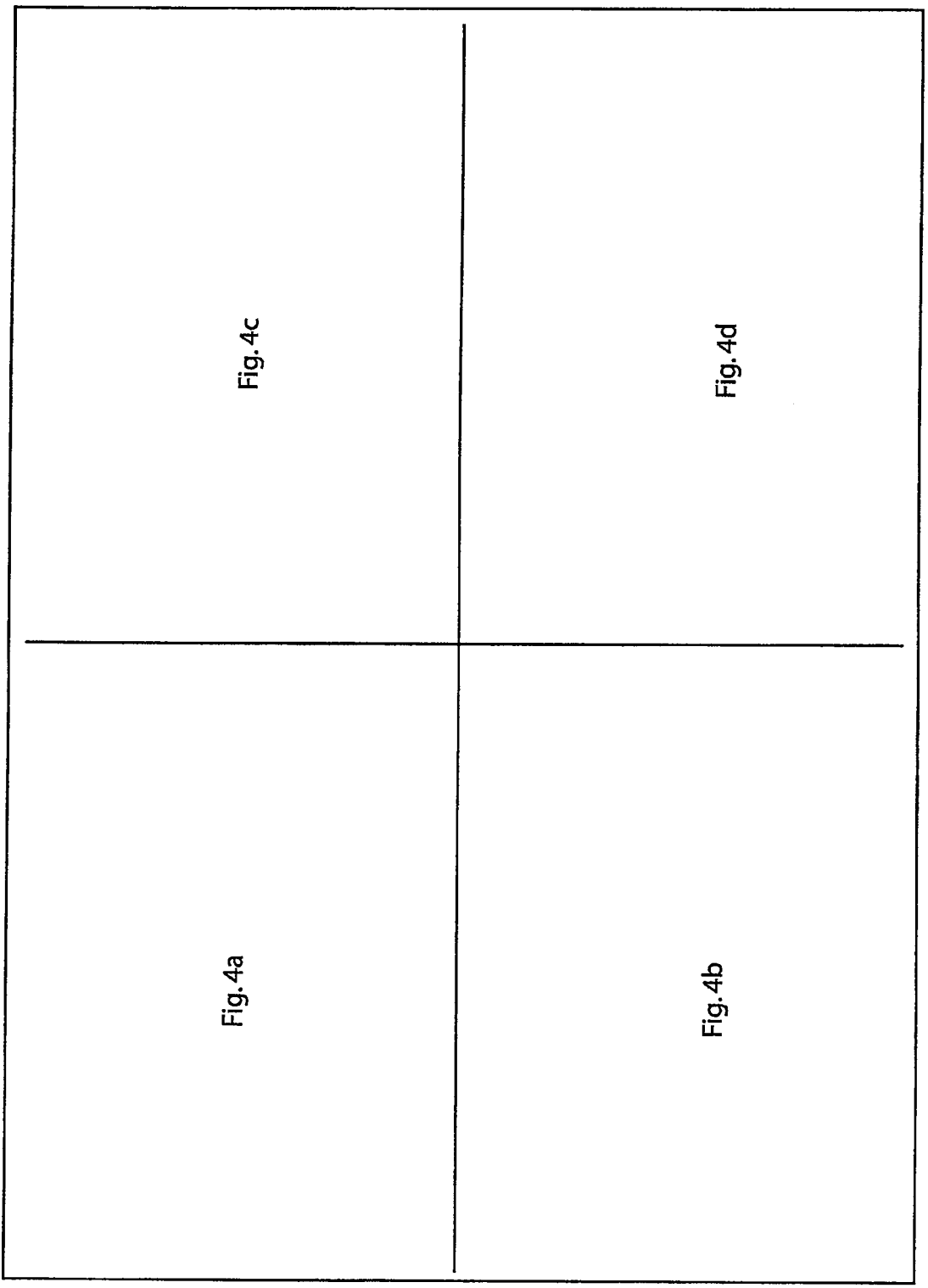
FIG. 4 depicts a directed graph representing data triplets of the type maintained in a data store according to the invention.
Figure 4A:
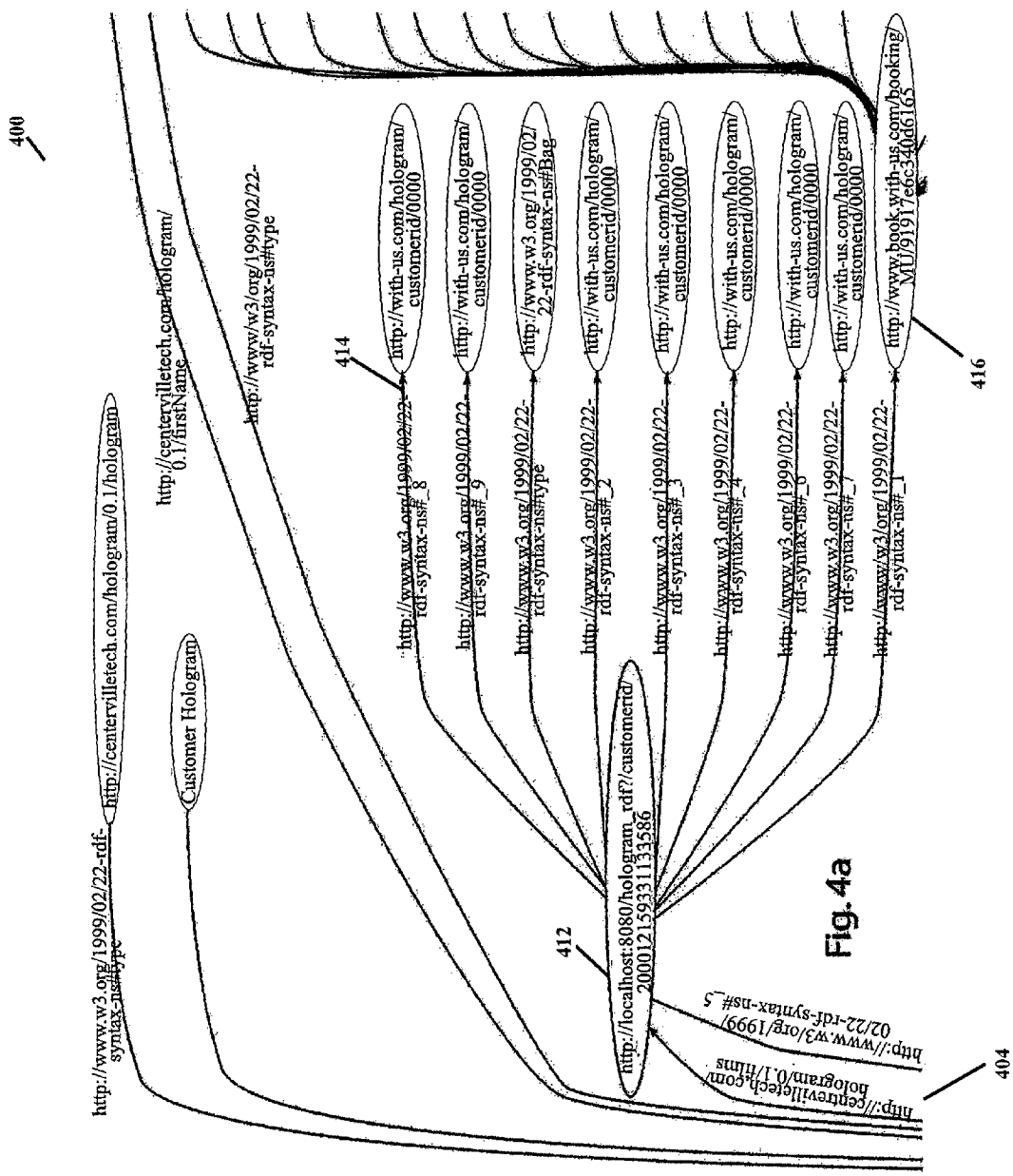
Figure 4B:
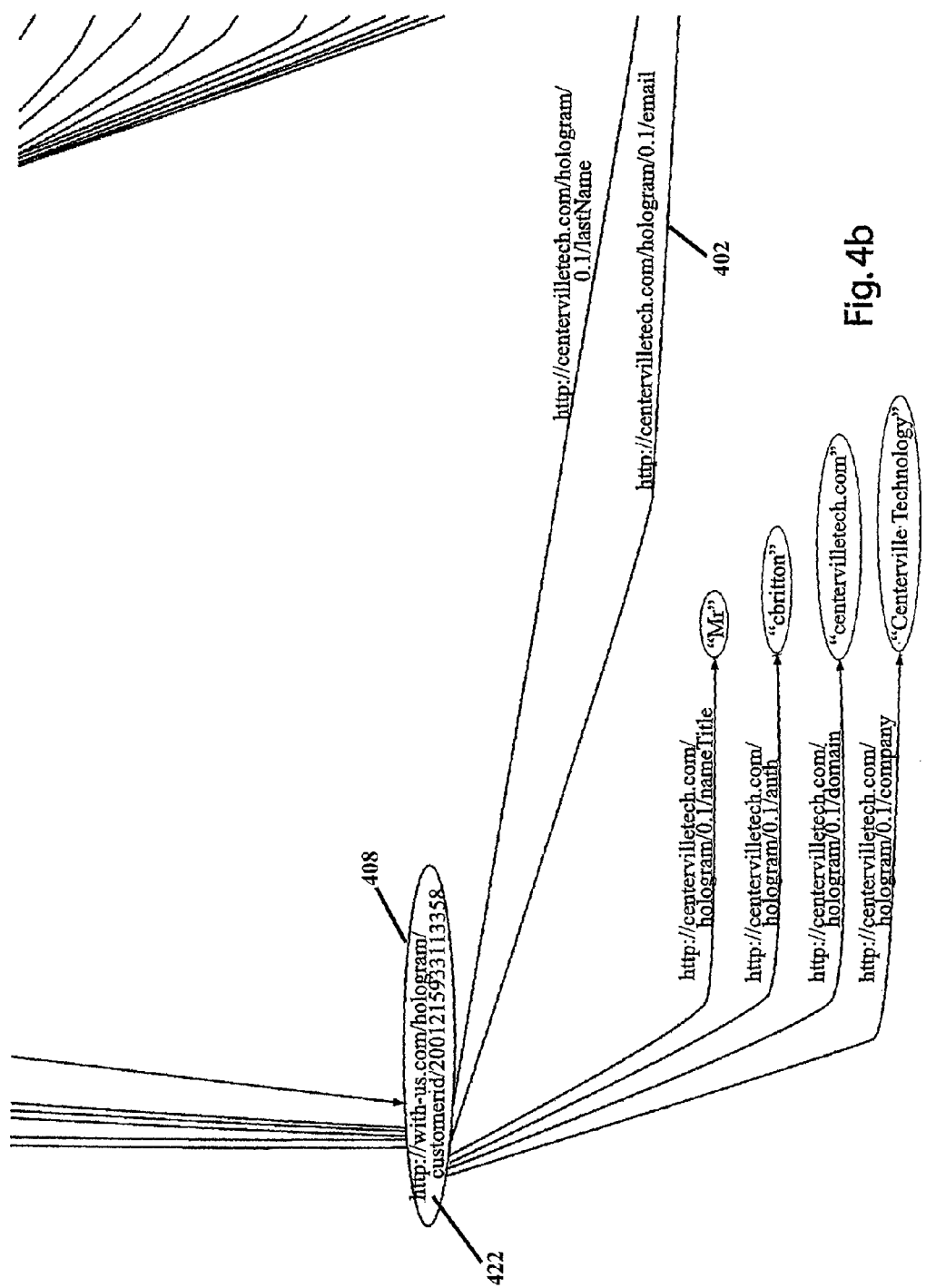
Figure 4C:
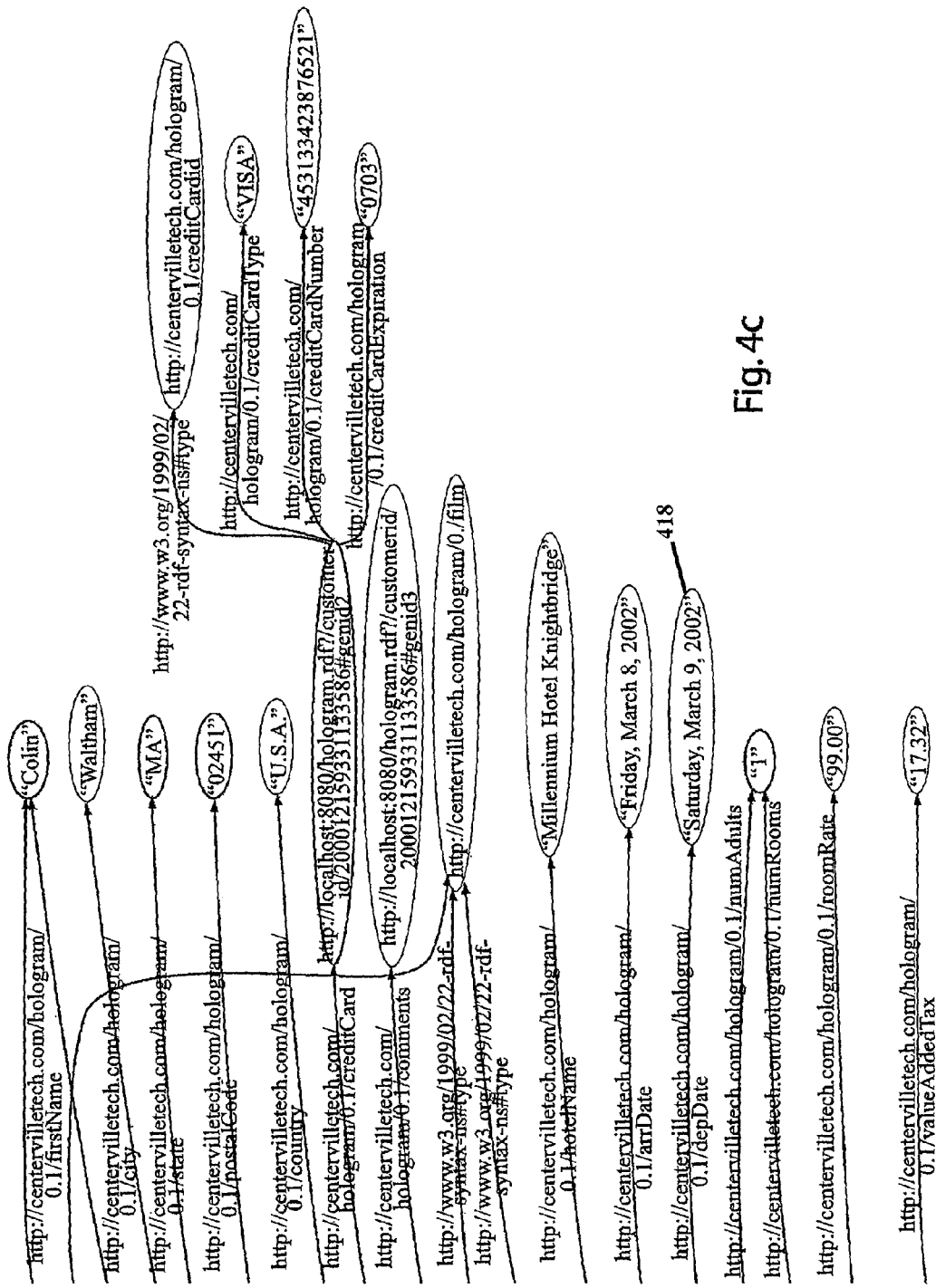
Figure 4D:
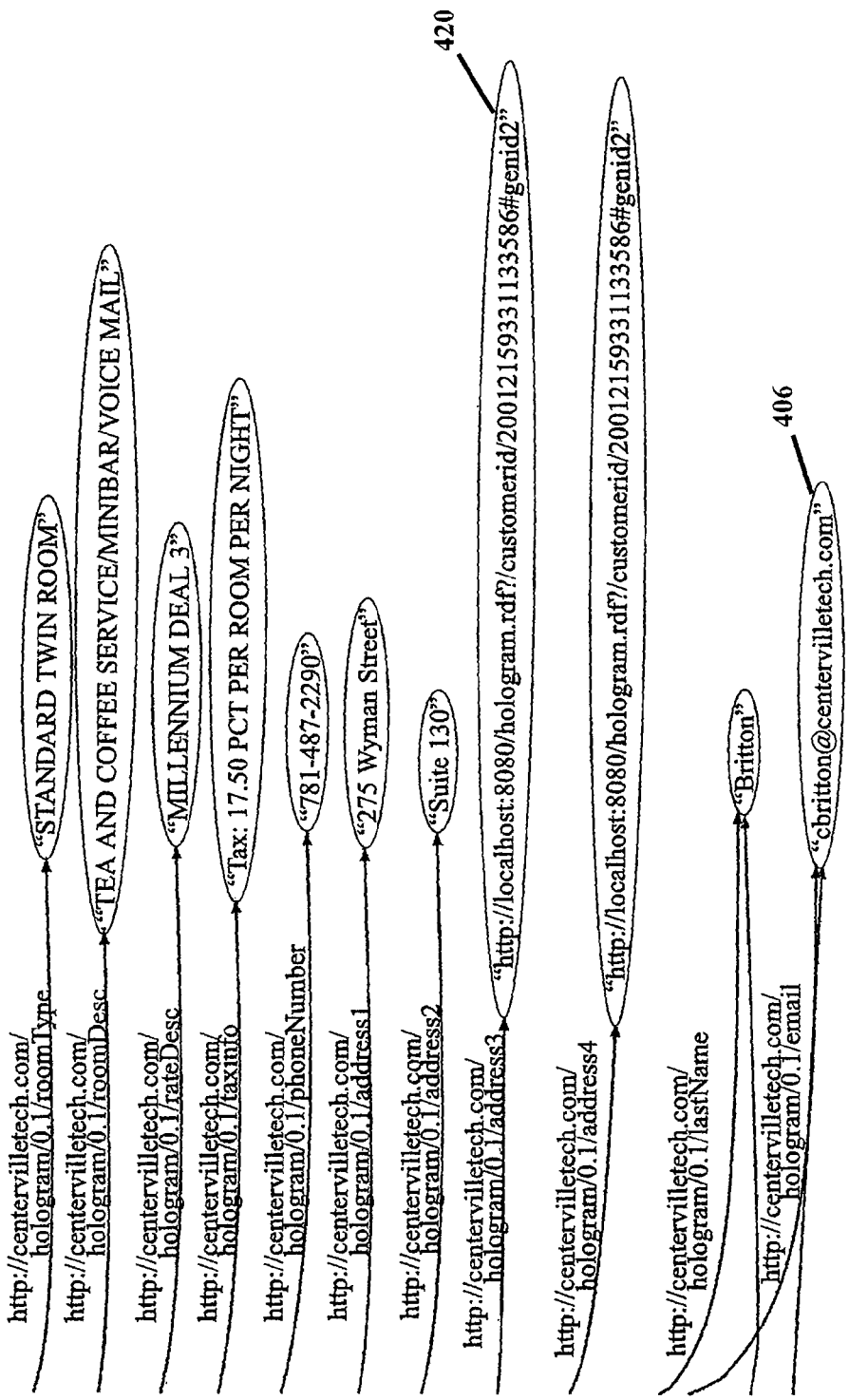

Referring to FIG. 4, the data store can store—by way of non-limiting example—RDF triplets representing data from marketing and/or e-commerce "legacy" databases. The figure particularly illustrates triplets representing hotel reservation transactions. Each triplet comprises a predicate 402, subject 406 and object 408 such that the object 408 is "linked" to its subject(s) 406 via predicate(s) 402.

In the illustrated example, each predicate 402 is assigned a Uniform Resource Indicator ("URI") 410 such that related data is located via URI's in a hierarchical ordering, represented for example by the directed arrow 402. If the triplet is high-level 408 its URI 404 points to a lower set of triplets 412, each of which has a URI 414 that may point to data or to further triplets 416.

Each subject 406 contains transactional information pertaining to an enterprise resource item, e.g. credit card type, type of product bought or date. For example, as illustrated in FIG. 4, a typical subject 420 shows a value of "data of departure" related to a hotel booking transaction. It can be appreciated from one in the art that many different types of data may be contained within the subject, e.g. literal values, referenced values or additional URI's.

An object 408 contains information pertaining to the "who" of the transaction, such as the person or enterprise initiating the transaction. The object, similar to the subject, may be a literal, e.g. "Smith", or a unique identifier such as a locator address 422 such that each related predicate and subject can be referenced through the object.

It can be appreciated that any given transaction (or other event that gives rise to triplets of the type stored in the data store 114) may be reflected in multiple legacy database systems 140. When those systems are queried by the connectors, this may result in multiple triplets causing redundant or related information to be stored within the holographic store 114. The illustrated data store 114 includes a relationalizer that periodically passes through the retained triplets to combine these related triplets into "bags," at the same time removing any redundancies as determined by a calculated confidence level or other similar technique. This can be performed by comparing sequential levels of objects and merging triplets and bags of similar objects. For example, two people at the same address and same last name may be merged into a "family" bag, and so on. In this way, data storage is both minimized and related such that queries can be executed using the minimal execution time. The data store 114 can also remove redundant information from the legacy databases 140 in a similar manner dependent on the capabilities of the specific database.

The data store 114 includes a graph generator (not shown) that uses the stored triplets to generate directed graphs in response to queries (e.g., in ICQL form) from the framework server 116. These may be queries for information reflected by triplets originating from data in one or more of the legacy databases 140 (one example might be a request for the residence cities of hotel guests who booked reservations on account over Independence Day weekend, as reflected by data from an e-Commerce database and an Accounts Receivable database). Such generation of directed graphs from triplets can be accomplished in any conventional manner known the art (e.g., as appropriate to RDF triples or other manner in which the information is stored). Directed graphs generated by the data store are passed back to the server 116 for presentation to the user.

In the event that the data store 114 does not include sufficient information (e.g., triplets) necessary to respond to a query from the framework server 116, it can pass the query directly to the connectors 108 for application to the legacy databases 140. Alternatively or in addition, the data store 114 can construct further queries necessary to "fill out" the triplet store with legacy database information necessary to respond to the query.

In a preferred embodiment, illustrated data store 114 polls the legacy database systems 140 (via connectors 108) to obtain current information at pre-determined intervals, times or otherwise. This can be accomplished using the queries stored within the data store 114 or the connectors 108 themselves.

Referring back to FIG. 1, the framework server 116 generates requests to the data store 114 (and/or indirectly to the legacy databases via connectors 108, as discussed above) and presents information therefrom to the user via browser 118. The requests can be based on ICQL requests entered directly by the user though, preferably, they are generated by the server 116 based on user selections/responses to questions, dialog boxes or other user-input controls. In a preferred embodiment, the framework server includes one or more user interface modules, plug-ins, or the like, each for generating queries of a particular nature. One such module, for example, generates queries pertaining to marketing information, another such module generates queries pertaining to financial information, and so forth.

In addition to generating queries, the framework server (and/or the aforementioned modules) "walks" directed graphs generated by the data store 114 to present to the user (via browser 118) any specific items of requested information. Such walking of the directed graphs can be accomplished via any conventional technique known in the art. Presentation of questions, dialog boxes or other user-input controls to the user and, likewise, presentation of responses thereto based on the directed graph can be accomplished via conventional server/browser or other user interface technology.

In some embodiments, the framework server 116 permits a user to update data stored in the data store 114 and, thereby, that stored in the legacy databases 140. To this end, changes made to data displayed by the browser 118 are transmitted by server 116 to data store 114. There, any triplets implicated by the change are updated and forwarded to the respective legacy databases 140, which utilize the corresponding API (or other interface mechanisms) to update their respective stores.

In some embodiments, the server 116 can present to the user not only data from the data store 114, but also data gleaned by the server directly from other sources. Thus, for example, the server 116 can directly query an enterprise website for statistics regarding web page usage, or otherwise.

A further understanding of the operation of the framework server 116 and of the illustrated embodiment may be attained by reference to the appendix filed herewith.

Described herein are methods and apparatus meeting the above-mentioned objects. It will be appreciated that the illustrated embodiment is merely an example of the invention and that other embodiments, incorporating changes to those described herein, fall within the scope of the invention.

The invention claimed is:

1. A digital data processing method for enterprise application integration comprising:
   A. electronically downloading to one or more digital data processors functionality that effects information transfers between a first database and a second database and between the first database and a third database,
   B. executing the functionality on the one or more digital data processors to effect transferring information between the first database and the second database, the transferring step including at least:
      (i) receiving information from the second database using an application program interface ("API") associated therewith,
      (ii) transforming at least some of the information received from the second database into resource definition format ("RDF") triplets, and
      (iii) transmitting those RDF triplets to the first database;
   C. executing the functionality on the one or more digital data processors to effect transferring information between the first database and the third database, the transferring step including at least:
      (i) receiving the information from the third database using an application program interface ("API") different than the API associated with the second database,
      (ii) transforming at least some of the information received from the third database into resource definition format ("RDF") triplets, and
      (iii) transmitting those RDF triplets to the first database;
   D. wherein the first database stores the RDF triplets from the second and third databases for query, for coalescence, or for use in generating directed graphs that can be analyzed to discern answers to queries for information reflected by the RDF triplets and originating from any of the second and third databases.

2. A method according to claim 1, wherein the information transferred between the first database and the second database comprises requests for data and responses thereto.

3. A method according to claim 2, wherein the step of transferring information between the first database and the second database includes at least:
   (i) transmitting one or more requests for data to the second database,
   (ii) receiving one or more responses from the second database using an application program interface ("API"),
   (iii) transforming the one or more responses from the second database into resource definition format ("RDF") triplets, and
   (iv) transmitting those RDF triplets to the first database.

4. A method according to claim 3, wherein the information transferred between the first database and the third database comprises requests for data and responses thereto.

5. A method according to claim 4, wherein the step of transferring information between the first database and the third database includes at least:
   (i) transmitting one or more requests for data to the third database,
   (ii) receiving one or more responses from the third database using an application program interface ("API") different than the API used by the second database,
   (iii) transforming the one or more responses from the third database into resource definition format ("RDF") triplets, and
   (iv) transmitting those RDF triplets to the first database.

6. A method according to claim 1, wherein the RDF triplets have objects through which related predicates and subjects can be referenced.

7. A method according to claim 1, wherein the RDF triplets have objects that comprise any of a literal or an identifier.

8. A method according to claim 1, wherein the RDF triplets represent any of marketing information or an e-commerce or other transaction.

9. A method according to claim 1, wherein the functionality comprises a servlet executing within a virtual machine environment in the digital data processor.

10. A digital data processing method for enterprise application integration comprising:
    A. electronically downloading to one or more digital data processors functionality that effects information transfers between a first database and a second database and between the first database and a third database,
    B. storing a query for application to at least one of the second database and third database,
    C. executing the functionality on the one or more digital data processors to effect transferring information between the first database and the second database, the transferring step including:
       (i) applying a query to the second database using an application program interface ("API") associated therewith,
       (ii) receiving information from the second database using the API in response to the query,
       (iii) transforming at least some of the information received from the second database into resource definition format ("RDF") triplets,
       (iv) caching said RDF triplets for subsequent transfer to the first database,
       (v) transmitting the RDF triplets to the first database;
    D. executing the functionality on the one or more digital data processors to effect transferring information between the first database and the third database, the transferring step including:
       (i) applying a query to the third database using an application program interface
       ("API") associated therewith and different than the API used by the second database,
       (ii) receiving information from the third database using the API of the third database in response to the query,
       (iii) transforming at least some of the information received from the third database into resource definition format ("RDF") triplets,
       (iv) caching the RDF triplets for subsequent transfer to the first database,
       (v) transmitting the RDF triplets to the first database,
    E. wherein the first database stores the RDF triplets from the second and third databases for query, coalescence, or for use in generating directed graphs that can be analyzed to discern answers to queries for information reflected by the RDF triplets and originating from any of the second and third databases.

11. A method according to claim 10, wherein the RDF triplets include at least one of:
    a subject that comprises any of a literal value, reference value and uniform identification number ("URI"),
    a predicate that comprises a URI such that related data being transferred between the first and second databases is represented by URI's in a hierarchical ordering,
    an object that relates a predicate and subject comprising any of a literal or identifier.

12. A digital data processing method for enterprise application integration comprising:

A. electronically downloading to one or more digital data processors functionality that effects information transfers between a first database and a second database,
B. executing the functionality on the one or more digital data processors to effect transferring information between the first database and the second database, the transferring step including at least:
  (i) originating, with the one or more digital data processors, one or more requests for data,
  (ii) storing, with the one or more digital data processors, one or more requests for data,
  (iii) applying to the second database, using the one or more digital data processors and an application program interface ("API") associated with the second database, the one or more requests originated by the one or more digital data processors and/or the one or more requests stored by the one or more digital data processors, and
  (iv) re-applying to the second database, using the one or more digital data processors and the API associated with the second database, the one or more requests originated by the one or more digital data processors and/or the one or more requests stored by the one or more digital data processors,
  (v) receiving one or more responses from the second database to the one or more requests from any of steps (iii) and (iv),
  (vi) transforming the one or more responses received from the second database into resource definition format ("RDF") triplets, and
  (vii) transmitting the RDF triplets to the first database, wherein the first database stores the RDF triplets from the second database for query, coalescence, or for use in generating directed graphs that can be analyzed to discern answers to queries for information reflected by the RDF triplets and originating from at least the second database.

13. The method of claim 12, wherein the one or more stored requests for data are received by the one or more digital data processors from the first database.

14. The method of claim 12, wherein the transferring step further includes translating the one or more responses from the API of the second database to a protocol associated with the first database.

15. The method of claim 12, wherein the RDF triplets have subjects that comprise any of a literal value, reference value and uniform resource identifier ("URI").

16. The method of claim 12, wherein the RDF triplets have predicates that comprise a URI, such that related data being transferred between the first and second databases and/or between the first and third databases is represented by URIs in a hierarchical ordering.

* * * * *